United States Patent [19]
Flandin-Blety

[11] Patent Number: 4,563,127
[45] Date of Patent: Jan. 7, 1986

[54] HYDRAULIC TURBINE

[76] Inventor: Georges Flandin-Blety, 8 Impasse des Muges, 13008 Marseille, France

[21] Appl. No.: 717,488

[22] Filed: Mar. 29, 1985

Related U.S. Application Data

[63] Continuation of Ser. No. 626,475, Jul. 2, 1984, abandoned, which is a continuation of Ser. No. 498,035, May 31, 1983, abandoned, which is a continuation of Ser. No. 174,407, Aug. 1, 1980, abandoned.

[30] Foreign Application Priority Data

Aug. 3, 1979 [FR] France .............................. 79 19936

[51] Int. Cl.$^4$ .......................... F03B 3/02; F03B 13/00
[52] U.S. Cl. .................................. 415/184; 415/186; 415/202; 416/185
[58] Field of Search ............................ 415/183–187, 415/202, 205; 416/185

[56] References Cited

U.S. PATENT DOCUMENTS

| Re. 13,665 | 12/1913 | Moss | 415/183 X |
|---|---|---|---|
| 890,918 | 6/1908 | Mayberry | 415/186 |
| 1,281,478 | 10/1918 | Antisell | 415/183 X |
| 2,663,424 | 12/1953 | Bynum | 415/184 X |
| 3,231,238 | 1/1966 | Hoffstrom | 415/186 |

FOREIGN PATENT DOCUMENTS

| 2370874 | 11/1976 | France | 415/184 |
|---|---|---|---|
| 384833 | 12/1932 | United Kingdom | 415/186 |

Primary Examiner—Robert E. Garrett
Assistant Examiner—Joseph M. Pitko
Attorney, Agent, or Firm—William A. Drucker

[57] ABSTRACT

A hydraulic turbine is of the kind having a distributor including a passage, without blades therein, which communicates with the movable blades of a rotor, having four blades, by means of injectors constituted by gaps formed between adjacent portions of a circular ring, the number of which is double that of the blades. The water escape axially to the center of the rotor chamber. The improvement of the present invention is that, in combination, the blades have a profile of an arc of a circle, and the portions of the stator ring which define the injector gaps each have a plane terminal face inclined at substantially 45° to the corresponding radius of the respective portion of the ring and, for a first injector, forming an angle of substantially 135° with a plane tangential to the external surface of the corresponding blade, when that blade occupies a position in which an adjacent blade is about to cooperate with the respective injector.

8 Claims, 4 Drawing Figures

HYDRAULIC TURBINE

This application is a continuation of application Ser. No. 626,475, filed July 2, 1984, which is a continuation of Ser. No. 498,035 filed May 31, 1983 which is a continuation of Ser. No. 174,407 filed Aug. 1, 1980, all now abandoned.

BACKGROUND OF THE INVENTION

In the French Pat. No. 76 35439 published under No. 2370874 filed Nov. 16th, 1976 by the applicant, there is described a turbine rotating at speeds of the order of 3000 rotations per minute for example and adapted to drive tools such as brushes or the like, intended especially for underwater operations.

This turbine can be driven by a motor pump providing water under a pressure or several bars with an output of the order of one to several tens of cubic meters per hour, and permits the construction of portable apparatuses.

According to the said patent, the turbine comprises a distributor presented in the form of a passage without blades which communicates, with the blades of a rotor with four blades, by means of injectors constituted by openings formed between portions of a circular stator ring, in number double that of the blades, the water escaping axially to the centre of the rotor chamber.

Subsequent work of the applicant has permitted him to discover that such a turbine only functions correctly and with a satisfactory output if a certain number of conditions of shape and of dimensions are respected.

Consequently, the turbine according to the invention is principally characterised in that the blades have a profile of an arc of a circle, that the portions of the stator ring which define the injectors each have a plane terminal face inclined at substantially 45° to the corresponding radius of the respective portion of ring and, for a first injector, forming an angle substantially equal to 135° with the plane tangential to the external surface of the corresponding blade, when this latter occupies a position in which an adjacent blade is on the point of commencing to cooperate with the respective injector.

According to another feature of the invention, in the said position of a blade, it cooperates with a second injector the plane terminal face of which forms an angle substantially equal to 120° with the plane tangential to the external surface of the said blade and the difference of inclination of the two consecutive jets acting on the same blade is always substantially equal to 15°.

Another feature of the invention is that the ratio between the external radius of the said arcs of a circle and the internal radius of the said stator ring is substantially equal to ¾.

BRIEF DESCRIPTION OF THE DRAWINGS

Other features, as well as the advantages of the invention, will appear clearly in the light of the following description.

In the accompanying drawing.

DESCRIPTION OF THE PREFERRED EMBODIMENT

Figure 1:
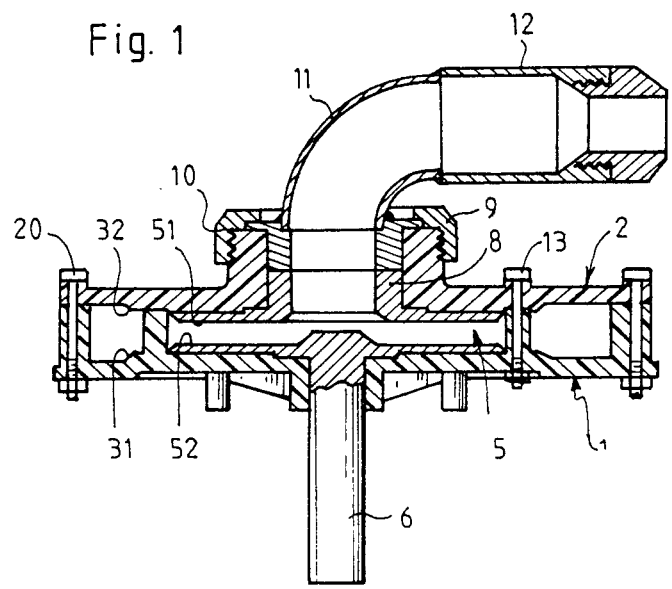
FIG. 1 is a view in elevation and in section, on a reduced scale, of a turbine in accordance with a preferred manner of carrying out the invention.

Referring to the drawings, in FIG. 1, the stator of the turbine is composed of a principal body 1 closed by a plate 2 fixed to the body 1 at its periphery by means of bolts 20.

Figure 2:
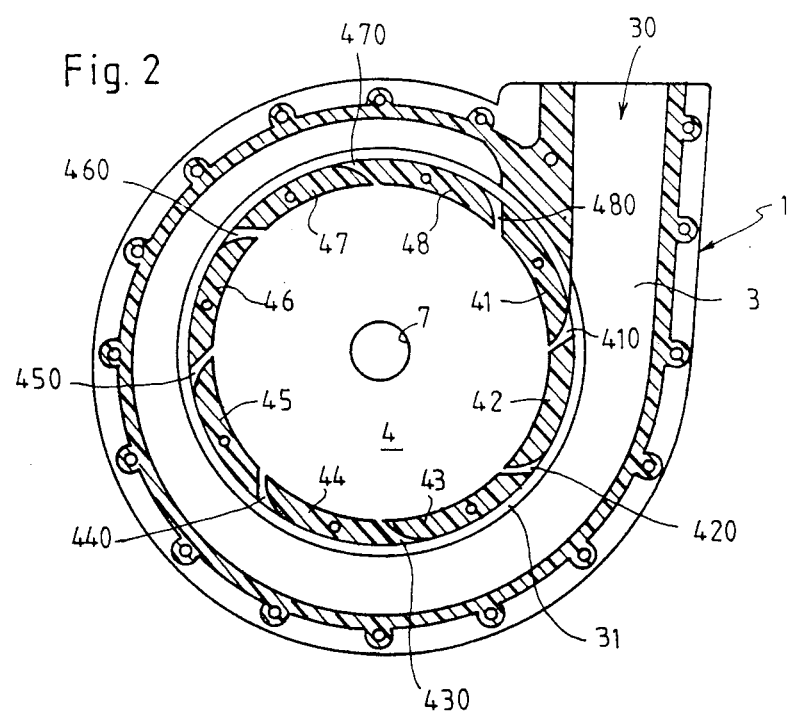
FIG. 2 is a view in section taken on a plane perpendicular to the axis of the rotor, the rotor being removed.

As can be seen in FIGS. 1 and 2, the body 1 defines a passage 3 closed by the plate 2 and provided at 30 with a water admission opening and a flat cylindrical chamber 4 which receives the rotor 5, the shaft 6 of which passes axially through a circular opening 7 formed in the base of the chamber 4 and is journalled in this opening. The opposite face of the rotor comprises a hollow axle 8 which is journalled in a bearing 9 formed by the central part of the plate 2 and externally threaded. The bearing 9 is itself capped by a retaining ring 10 serving for the coupling of a curved conduit 11 movable in all directions and provided with a pipe 12.

The external circular wall of the chamber 4 is constituted, in the preferred manner of construction described, of eight portions 41 to 48, fast with the body 1. The plate 2 is fixed on the body 1 by means of bolts 13 and 20. These portions, which each cover an angle equal to 45°, are separated one from another by spaces 410-420-430-440-450-460-470 and 480, closed at the top by the plate 2 and constituting injectors of water from the passage 3 towards the chamber 4. Each injector is bounded by a plane surface, such as 441 of the portion 45 (FIG. 4) inclined at 45° with respect to the corresponding radius of the rotor and by a cylindrical surface 442 which joins with the internal and external cylindrical surfaces of one of the portions 44. The developed shape of the passage 3 in a plane perpendicular to the axis of the rotor has the general form of an isosceles trapezium the major base of which corresponds to the opening 30 and the minor base of which is in the zone of the injector 480. The sides of this trapezium when extended form an angle of about 87° with its major base. In its part which communicates with the central chamber, the passage 3 has a rectangular section (FIG. 1) comprising two chamfers 31–32 inclined at 30°.

Figure 3:
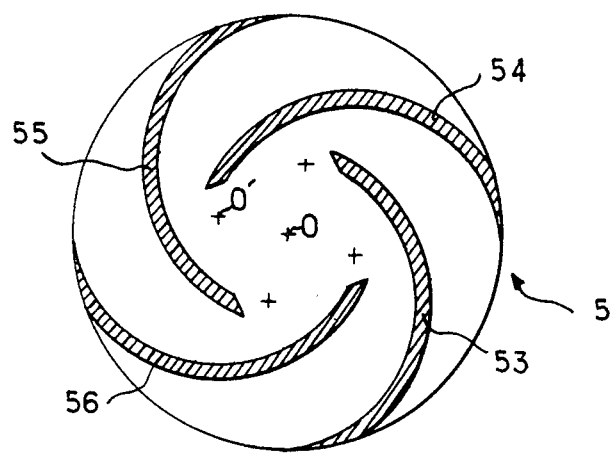
FIG. 3 is a schematic view of the rotor, showing the blades.

The rotor (FIGS. 1, 3 and 4) is formed of two discs 51, 52 having a diameter substantially equal to that of the chamber 4 (a play of 1% between the diameter of the rotor and that of the chamber of the stator is advantageously provided) and between which are provided four blades 53 to 56, the lower disc 52 not being provided with any opening, whilst the upper disc 51 is provided with the base opening of the hollow shaft 8; in other words, the water which enters through an injector $I_1$ (FIG. 4) works in a chamber bounded, on the arrival side, by two cylindrical portions of the wall of the chamber 4 of the stator and by two blades, and on the exit side, passing out between the ends of the two blades, in the region of the opening of the shaft 8, through which it escapes.

Figure 4:
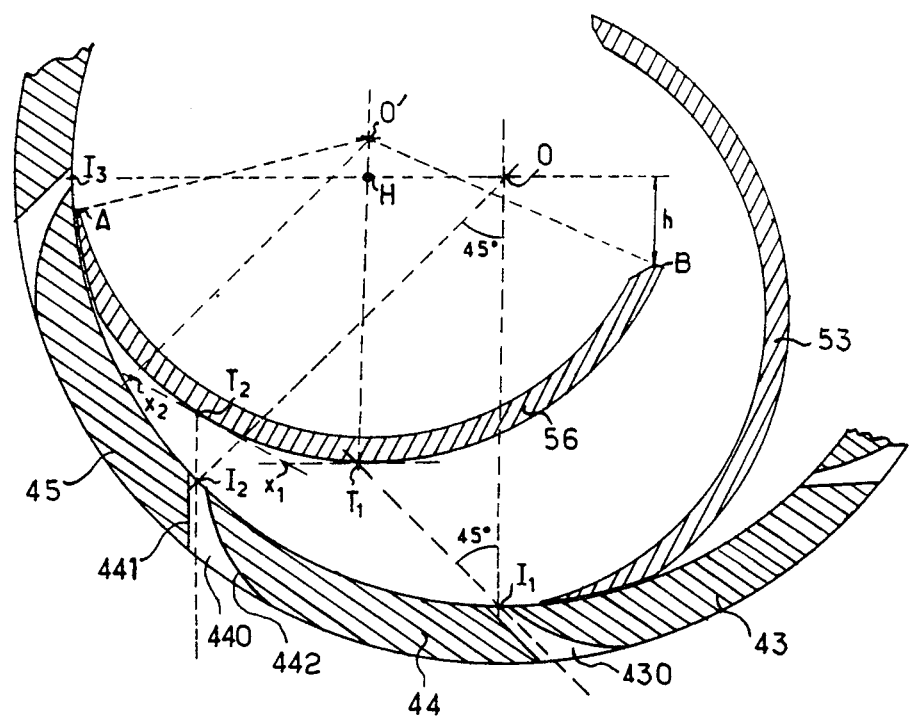
FIG. 4 is a diagram intended to show the positioning of the blades and of the injection ring.

FIG. 4 shows that, the rotor being positioned as illustrated in this figure, for a radius $ROI_1$ of the rotor having a centre O, of 59.5 cm., the centre O' of the blade 56 will be determined with 41.5 mm of internal radius and 45 mm of external radius, by tracing a right-angled triangle O HO' with OH=19 mm and HO'=5 mm, which corresponds to OO'=19 mm 65.

More generally, the four centres of the arcs of circle which constitute the blades will preferably be situated on a circumference of centre O and of radius 0.33 R. These four centres are thus situated on two orthogonal axes.

There has been considered, in FIG. 4, a position of the rotor wherein an end A of the blade 56 is just coming level the lower edge of an outlet opening of an injector (more precisely in which the internal arc of a circle of the blade joins to the stator wall at the point where the latter is cut by the straight line $OHI_3$). The other end B of the blade 56 is then on a radius O'B, such that the angle at the centre BO'-A is substantially 140°. Preferably, the end corresponding to A is a portion of circular surface parallel to the opposed stator surface, the play between these two surfaces being about 1% of the diameter of the rotor.

The radius of the cylindrical surface (such as 442) of each injector is advantageously 25 mm.

According to an essential feature of the device described, in the position of the rotor shown in FIG. 4 (wherein the internal wall of the outer end of each blade joins to the internal surface of the chamber in the region of one injector of two) the directions $I_1T_1$ and $I_2T_2$, parallel to the flat walls of the injectors (that is to say inclined at 45° to $OI_1$ and $OI_2$, $I_1$ and $I_2$ being the centres of the rectangular windows, 10 mm long and 2 mm wide in the example described, through which the injectors open into the chamber 4) are respectively inclined at 135° and 120° to the tangents to the blade at $T_1$ and $T_2$ (there are half-tangents $T_1x_1$ and $T_2x_2$ directed from right to left).

In order to operate the turbine which has been described, water is injected under pressure (from 0.3 to 10 bars and preferably of the order of 3 to 5 bars for example) through the opening 30 (to which a motor pump is connected). The water enters into each working chamber through two injectors, respectively in the directions $I_1T_1$ and $I_2T_2$. The corresponding forces of impact on each blade, in the position of the rotor shown in FIG. 4, have respective tangential components directed as $T_1x_1$ and $T_2x_2$. As a result there is a couple with respect to the centre O and the rotor is driven in rotation in the clockwise direction.

It will be noted that, as a result of this rotation, the blade 56 will immediately cease to receive the impact of the water ejected at $I_1$, whilst it will continue to receive the impact of the water injected at $I_2$ and commences to receive the impact of the water injected at $I_3$, until $I_2T_2$ in its turn makes an angle of 135° with $T_1x_1$. At the same time, the blade 53 will commence to receive the jet injected at $I_1$, substantially at an angle of 120° with the tangent. Put in another manner, the angles of 120° and 135° substantially constitute the maximum and minimum values of the variable angle which each of the two jets of water injected on each blade makes with the tangent to the blade. Further, the difference of inclination of the jets is always equal to 15°.

Trials carried out by the Applicant have shown that the output of the turbine decreases rapidly when the maximum angle $I_1 T_1 x_1$ departs from the critical value of 135°. When the said angle passes for example from 135° to 145°, the output can diminish by 30%, whilst it diminishes by 40% if the angle passes from 135° to 125°. Outside these limits, one might consider that the turbine is no longer adapted to function in practice, the rotor being able to cease rotating.

It is to be noted that the jet of water injected at $I_1$ in the position of FIG. 4 divides itself, after impact on the blade, into a portion which escapes rapidly and directly towards the outlet of the chamber and a portion which finds itself so to speak jammed in the narrow part of the chamber; it forms vortices and risks the causing of an excessive slowing of the rotor if it represents a too large portion of the jet, which is the case when the maximum angle exceeds substantially 135°. In the case where, on the contrary, the maximum angle is substantially lower than 135°, then on the one hand the tangential component of the impact force of the jet diminishes, and on the other hand the proportion of the jet which escapes directly towards the outlet increases, so that the output falls very rapidly. In practice, it will be held to the value of 135°, the variation having to remain lower than 5°.

The trials have likewise shown that the value of the minimum angle of impact at $I_2$ is critical (not having to vary from the value of 120° by more than 10% and, preferably 5%). When the minimum angle departs from the values indicated, there are found the same phenomena as when the maximum angle is caused to depart from the optimum value.

Preferably, the difference between the two extreme angles must moreover substantially not depart by more than one degree from the critical value of 15°.

The angular values mentioned above and which constitute an essential feature of the invention will have to remain the same if the turbine has dimensions different from those mentioned, or works at different pressures.

The structure of the turbine is finally principally characterised by the number of the blades (which will always be equal to four), the number and the disposition of the injectors (eight injectors having a surface such that the principal direction of the jet shall be substantially inclined at 45° to the corresponding radius of the stator and substantially positioned at 45° one from another), the shaping in the form of an arc of a circle of the blades and the said angular values, the principal one of which is constituted by the value of 135° defined hereinabove.

Nevertheless, other features will be found to be important.

The principal one of these supplementary features is the ratio between the external radius of the blades and the radius of the rotor, which ratio is substantially equal to $\frac{3}{4}$ in the manner of construction preferred and described above. It will be noted that upon this ratio there depends the greater or lesser widening of each of the chambers in which the water works. The optimal escape of water is moreover related to the value (140') of the angle BO'A. All of the dimensions indicated in the example described are clearly valid for a close homothesis.

It is convenient to note here that the ratio of radii mentioned above determines in practice the position of the centre O' when one has fixed the radius of the rotor and the values of the maximum and minimum angles $I_1 T_1 x_1$ and $I_2 T_2 x_2$. In effect it is then a question of tracing an arc of a circle (56, FIG. 4) of given radius which passes through the known point $I_3$ and cuts the half-lines $I_1T_1$ and $I_2T_2$ of known position at two respective points $T_1$ and $T_2$ such that the angle $T_1 O' T_1$ makes 30° and that the tangent $T_1x_1$ to this circle shall be perpendicular to $O_1I_1$.

Another supplementary feature is the presence of a play, preferably of the order of 1% of the diameter of the rotor, between the latter and the stator chamber 4. This play permits a certain passage of water between the working chambers and it will be seen that the output decreases if it is reduced or increased with respect to the value indicated. A play, preferably substantially equal to 3% of the height of the stator chamber, is likewise provided between the latter and the opposed surfaces of the discs 51 and 52. This play, which is not shown in FIG. 1, permits axial balancing of the rotor and avoids jammings which particularly harm the output.

Another supplementary feature is the value, preferably equal to 87°, of the angle defined hereinabove for the passage 3. The lateral walls of this passage are thus inclined at 3° with respect to the median direction of the flow of water admitted into the turbine. As a result there is a good flow of water along the walls of the passage and the progressive reduction of the water admitted by the successive injectors, which is finally favourable to its good operation.

Another supplementary feature resides in the value, preferably equal to 30° as indicated above, of the angle formed by the chamfers 31,32 (FIG. 1) with the upper and lower walls of the passage 3, at the side of the rotor; it has been found that these chamfers facilitate the sliding along of the water and likewise facilitate the axial balancing of the rotor.

A last feature is constituted by the preferential minimum value of the ratio between the surface of the propulsion jet (that is to say of the internal section of the end of the pipe 12) (FIG. 1) and the total surface of the eight admission windows for water into the stator chamber 4. It has been indicated above that each of these windows was 10 mm×2 mm, in the construction described, which gives a surface of 160 mm² for the whole assembly. It has been found that the said internal section should preferably have a minimal section of 180% of this value, or at least 288 m². In the example described, it is a circle of 20 mm diameter. If this condition is not respected, the counter-pressure due to the escape of the water jet through the pipe brakes the rotor of the turbine.

It will be noted that when it is not desired to utilise an effect of propulsion in the water of the assembly constituted by the turbine and by the tools which are associated with it, which effect is provided by the jet which escapes through the pipe, the curved conduit 11 and the pipe 12 can be eliminated, the escape of the water then being free.

The turbine described can be manufactured at low cost by using molded plastics materials. It is obvious that various modifications of shape and of dimensions could be applied thereto, without nevertheless departing in any great extent from the limits imposed by the conditions fixed hereinabove, which are essential to its good operation with an acceptable output.

I claim:

1. A hydraulic turbine comprising a stator having a hollow body, a plate adapted to close said body, means for fixing said plate on said body at its periphery, a circular inner wall provided in said body which delimits a cylindrical inner chamber and a peripheral distributing chamber, said circular inner wall comprising a plurality of circular ring portions forming therebetween a plurality of successive injecting gaps for the passage of water between said distributing chamber and said cylindrical chamber, a water admission opening which communicates with said distributing chamber, first and second opposed circular openings coaxial to said cylindrical chamber respectively providing said body and said plate, a rotor located in said cylindrical chamber which comprises a driving shaft passing through said first circular opening, a hollow shaft which is journalled in said second circular opening and serves as exhaust duct, a first disc coaxially fixed to the driving shaft and a second disc provided with an axial escape opening, which is coaxially fixed to the hollow shaft, said first and second discs having a diameter substantially equal to that of the cylindrical chamber and being coaxial thereto, and four blades fixed to said two discs and extending therebetween, said blades each having a profile of an arc of circle with an inner end and an outer end, and being respectively centered on four center points located on a circle coaxial to said cylindrical chamber and situated two by two on two respective orthogonal axes, the inner end of said blades extending tangentially to said circle and the outer end of said blades being level with said circular wall, said injector gaps having a plane terminal face inclined at 45° with respect to the corresponding radius of the corresponding ring portion and forming with a plane tangential to the surface of a corresponding blade an angle which varies at uniform rate, when the rotor is rotating, between a first value obtained when the injector gap begins to cooperate with said corresponding blade and a second value obtained when said corresponding blade occupies a position in which an adjacent blade is at the point of cooperating with the same injector gap, said first value being equal to 120° with a tolerance of plus or minus 5° and the second value being equal to 135° with a tolerance less than plus or minus 5°.

2. The turbine according to claim 1, in which the ratio between the external radius of the said blades and the radius of the rotor is substantially equal to $\frac{3}{4}$.

3. The turbine according to claim 1, in which the radius of said circle is 0.33 time the internal radius of the circular inner wall.

4. The turbine according to claim 1, wherein a play of the order of 3% of the height of the cylindrical inner chamber is provided between the latter and the corresponding surfaces of the said discs.

5. The turbine according to claim 1, in which the developed profile of the peripheral distributing chamber in a plane perpendicular to the axis of the rotor has a form generally of an isosceles trapezium the major base of which corresponds to the inlet opening for water and the sides of which when extended form an angle substantially equal to 87° with the major base.

6. The turbine according to claim 1, in which said distributing chamber has its part which communicates with the cylindrical chamber through said gaps, a rectangular section comprising two chamfers inclined substantially at 30° to the plane of the bases of the same chambers.

7. The turbine according to claim 1, which comprises a curved conduit, movable in all directions and provided with a pipe connected to said hollow shaft.

8. The turbine according to claim 7, in which the surface of the straight internal section of the end of the pipe is at least equal to 1.8 time the total surface of the said eight injecting gaps.

* * * * *